Patented Feb. 16, 1926.

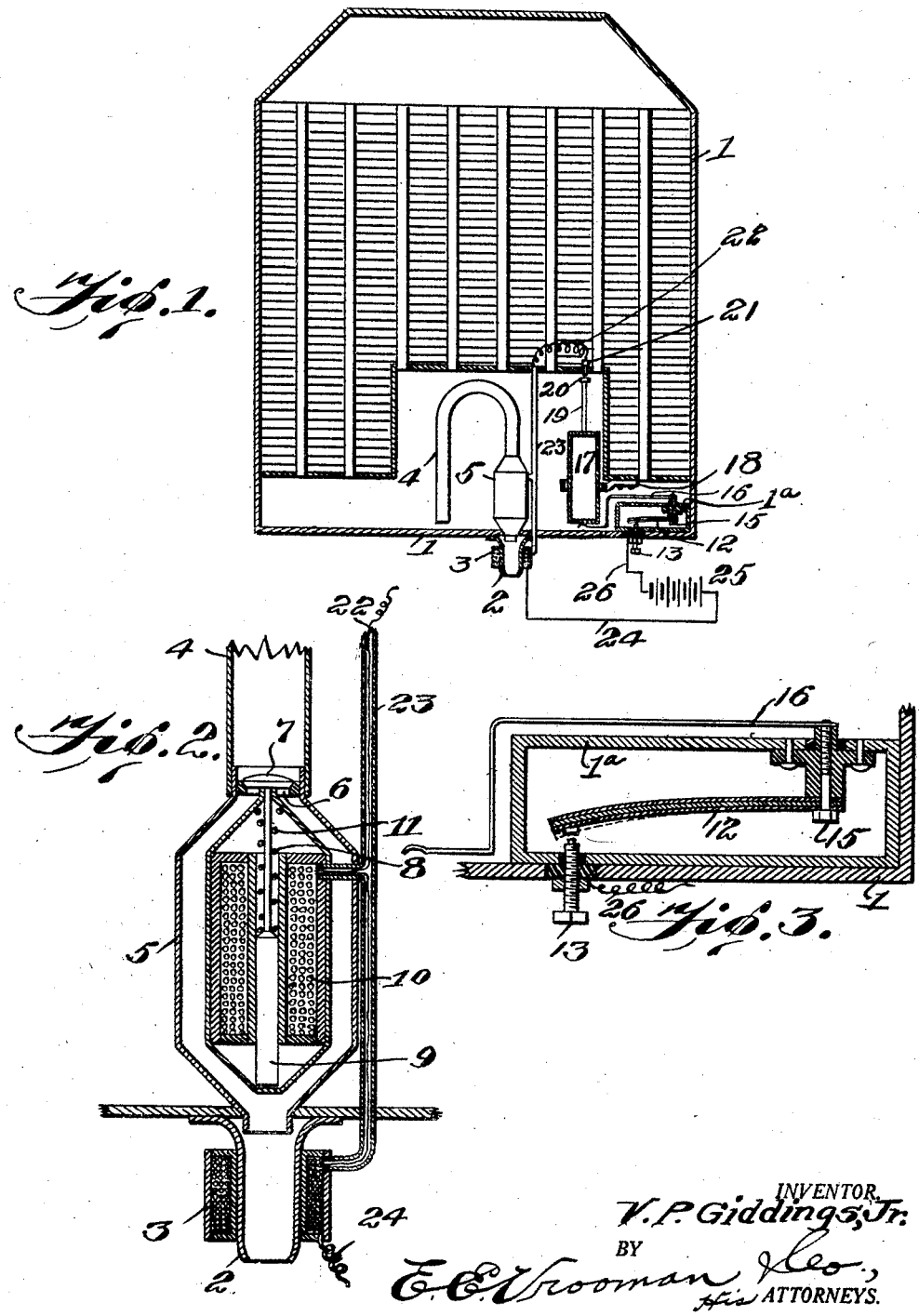

1,573,157

UNITED STATES PATENT OFFICE.

VICTOR P. GIDDINGS, JR., OF BEAUMONT, TEXAS.

SELF-EMPTYING MOTOR-VEHICLE RADIATOR.

Application filed October 1, 1925. Serial No. 59,840.

*To all whom it may concern:*

Be it known that I, VICTOR P. GIDDINGS, Jr., a citizen of the United States, residing at Beaumont, in the county of Jefferson and State of Texas, have invented certain new and useful Improvements in Self-Emptying Motor-Vehicle Radiators, of which the following is a specification, reference being had therein to the accompanying drawings.

This invention relates to a self-emptying motor vehicle radiator, and the object of the invention is the provision of simple and efficient means, operated by a change in the temperature of the water in the radiator for automatically discharging or releasing said water or liquid.

With the foregoing and other objects in view, my invention comprises certain novel constructions, combinations, and arrangements of parts, as will be hereinafter fully described, illustrated in the accompanying drawings, and more particularly pointed out in the appended claims.

In the drawings:

Figure 1 is a view showing a motor vehicle radiator in section, with my apparatus in position thereon.

Figure 2 is an enlarged, fragmentary, vertical sectional view of a portion of the apparatus.

Figure 3 is an enlarged, fragmentary sectional view of another portion of the apparatus showing particularly the thermostatic device of the apparatus.

Referring to the drawings by numerals, 1 designates the radiator and 2 is the discharge thereof; this discharge 2 is preferably a nozzle or pipe, around which is placed a low resistant coil 3, for heating the same when the device is in operation. A siphon pipe 4 is in the radiator 1, with its outer open end near the bottom of the radiator (Fig. 1) and its opposite end is connected to the top of the casing 5, which casing 5 discharges into the discharge pipe 2. In the top of casing 5 is a valve seat 6, upon which seat is normally seated a valve 7. Valve 7 is provided with a stem 8 that is secured to a sliding core 9 that is operated by the electromagnet 10 to raise and lower valve 7; that is, when the electromagnet 10 is energized, the valve will be opened and permit the water to be discharged from the radiator, and when the electromagnet is deenergized, the strength of the spring 11 is sufficient to positively seat valve 7, closing the pipe 4.

The thermostatic device comprises the thermostat 12 suitably insulated upon the casing 1ª within the radiator 1, Fig. 3, and is normally not in contact with the inner end of the adjustable screw 13, which screw is carried by and insulated from the radiator 1 and casing 1ª. The screw 13 is adjusted to a nicety so that the thermostat 12 will contact therewith when the temperature of the water in the radiator has dropped to a certain degree, such as thirty four degrees, which is just above freezing.

When the circuit is closed, at the screw 13 and thermostat 12, the apparatus will operate. The screw 15 (insulated upon casing 1ª) carrying the thermostat 12, is connected to the follow-up spring 16, which spring normally presses against the vertically movable float 17; this float 17 is slidably mounted in horizontal bracket 18. Fastened to the top of float 17 is a stem 19, provided with head 20, which head is adapted to contact with the terminal 21. This terminal 21 is connected to the wire 22, which wire 22 is threaded through pipe 23 and is connected to the electromagnet 10 and the electromagnet (the continuation of wire 22) is connected to the low resistant coil 3, and the low resistant coil 3 is connected by wire 24 to a battery 25, and the battery 25 is connected by wire 26 to screw 13.

In operation, with the radiator full of liquid or water, the head 20 is in contact with the terminal 21, and the valve 7 is tightly seated, with the contact broken, between the thermostat 12 and screw 13. As the temperature lowers, the thermostat 12 will move closer to the inner end of screw 13, and upon the temperature reaching the predetermined degree, the circuit will be closed through thermostat 12 and screw 13, whereupon valve 7 will move to an open position within pipe 4, and at the same time coil 3 will be heated, so that the water discharging from the radiator will not freeze and close the discharge pipe 2. When the radiator is emptied, float valve 17 will move downwardly against the pressure of spring 16, sufficiently to break the contact, at head 20 and terminal 21, whereby the circuit is broken, electromagnet 10 is deenergized, valve 7 seating snugly upon its seat, and the discharge pipe 2 is no longer heated.

It will, therefore, be seen that I have provided simple and efficient means to prevent water from freezing in a radiator.

Further, by reason of the float 17, the battery 25 will not be exhausted, for as soon as the radiator is empty, the apparatus will be placed in an inoperative condition, until the radiator is filled again, when the temperature is above the freezing point, or above the degree which the screw 13 and thermostat 12 are set to operate.

While I have described the preferred embodiment of my invention and illustrated the same in the accompanying drawing, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In an apparatus of the class described, the combination with a radiator provided with a discharge, of valve means for controlling said discharge, electric means for operating said valve means, means for heating said discharge, and electric current conducting means, the circuit of which is normally broken, connected to said valve operating means and said heating means for simultaneously operating the valve means and said heating means when the electric circuit is closed by the cooling of the fluid in the radiator and during the emptying of the radiator.

2. In an apparatus of the class described, the combination with a radiator provided with a discharge, of a valve for controlling said discharge, electric means for operating said valve, a thermostatic device carried by said radiator, a float in said radiator, heating means for said discharge, means electrically connecting said thermostatic device, float, valve operating means, and heating means to a source of energy, whereby when said thermostatic device is operated by temperature change, said valve will be operated to permit the emptying of the radiator and at the same time said discharge will be heated.

3. In an apparatus of the class described, the combination with a radiator provided with a normally closed discharge, of means for heating said discharge and at the same time opening said discharge so as to permit liquid to pass therethrough.

4. In an apparatus of the class described, the combination of a radiator provided with a valve controlled discharge, electrical means for operating said valve of said discharge, means for heating said discharge, and a thermostatic controlled means for operating said electrical means and said heating means of the discharge.

5. In an apparatus of the class described, the combination of a radiator provided with a valve controlled discharge, electrical means for operating said valve, and a float in said radiator normally electrically connected to said electrical means, and which upon the lowering of the water in the radiator will be operated to break the connection between it and said electrical means.

6. In an apparatus of the class described, the combination with a radiator, of valve controlled means for discharging liquid from the radiator, and means for operating said valve upon temperature change, said valve operating means comprising means within the radiator for placing said operating means in an inactive condition when the radiator is empty.

In testimony whereof I hereunto affix my signature.

VICTOR P. GIDDINGS, Jr.